| United States Patent [19] | [11] Patent Number: 4,720,529 |
| Kimura et al. | [45] Date of Patent: Jan. 19, 1988 |

[54] UV-RAY CURABLE POLYURETHANE COMPOSITION AND COATED OPTICAL FIBER

[75] Inventors: Takao Kimura, Mito; Shinzo Yamakawa, Katsuta; Ryotaro Ohono, Machida, all of Japan

[73] Assignees: Nippon Telegraph and Telephone Corporation; Japan Synthetic Rubber Company Limited, both of Tokyo, Japan

[21] Appl. No.: 844,304

[22] Filed: Mar. 26, 1986

[30] Foreign Application Priority Data

Mar. 29, 1985 [JP] Japan .................................. 60-66080

[51] Int. Cl.$^4$ .................. C08F 283/04; C08G 18/10; C08G 18/67
[52] U.S. Cl. ...................................... 525/454; 522/97; 526/301; 528/65; 528/66; 528/75
[58] Field of Search .................. 522/97; 526/301; 528/75, 65, 66; 525/454

[56] References Cited

U.S. PATENT DOCUMENTS

| 3,515,772 | 6/1970 | Lubowitz et al. | 528/75 |
| 3,714,110 | 1/1973 | Verdol et al. | 524/848 |
| 3,782,961 | 1/1974 | Takahashi et al. | 522/97 |
| 3,810,871 | 5/1974 | Borchert et al. | 528/67 |
| 4,192,684 | 3/1980 | Gensho et al. | 430/284 |
| 4,295,909 | 10/1981 | Baccei | 156/307.3 |
| 4,389,509 | 6/1983 | Pampouchidis et al. | 528/75 |
| 4,408,020 | 10/1983 | Kolycheck | 528/75 |

*Primary Examiner*—Harold D. Anderson
*Assistant Examiner*—Dennis R. Daley
*Attorney, Agent, or Firm*—Oblon, Fisher, Spivak, McClelland & Maier

[57] ABSTRACT

A UV-ray curable resin composition comprising a polyurethane derived from a polyether polyol and a diene polymer having hydroxyl group, said polyurethane having polymerizable double bond different from the carbon-carbon double bonds contained in said diene polymer having hydroxyl group, and a coated optical fiber having a coated layer comprising the cured product of said resin composition. This composition has good coating characteristics, and the cured product thereof has small modulus over a wide temperature range and good hydrolysis resistance, and water absorption resistance. The coated optical fiber has small transmission loss over a wide temperature range and has high strength even in water.

10 Claims, No Drawings

UV-RAY CURABLE POLYURETHANE COMPOSITION AND COATED OPTICAL FIBER

This invention relates to a UV-ray curable resin composition and a coated optical fiber having a coated layer comprising the cured product of said resin composition.

Optical fibers, particularly optical glass fibers are brittle and readily damaged and therefore involve the drawback that they are susceptible to damage even by a slight external force during manufacturing, storage and use. For this reason, optical glass fibers cannot be used as such as the medium for light transmission, and therefore, it is required to coat their surfaces with a coating material. Such coating materials for optical fibers, particularly primary coating materials, are demanded to be low in modulus at normal temperatures and low temperatures and high in hydrolysis resistance and water absorption resistance after curing, and further to have good coating characteristics when applied to optical fibers.

Also, the coating step of optical fibers is provided continuously immediately after drawing of optical fibers from the heat molten glass fiber mother material, and therefore the coating material is also demanded to have a high curing speed in order to improve productivity by enhancing the production rate of optical fibers. If the curing speed is small, the drawing speed during manufacturing of optical fibers must be lowered, whereby enhancement of productivity is impossible.

In the prior art, thermosetting type silicone resins have been employed as the coating material for optical fibers. The cured product of this resin is low in modulus from normal temperature to low temperature, and hence the transmission loss characteristics of the optical fiber coated with this resin has a specific feature of being excellent over a broad temperature range, but this resin involves the drawback of low curing speed, thus failing to enhance the production rate of optical fibers. Accordingly, in these days, UV-ray curable type resin is attracting attention as a coating material for optical fibers.

As such a UV-ray curable resin, a polybutadiene acrylate (Japanese Laid-open Patent Publication No. 7103/1983) or an urethane acrylate having the main chain with a polyether structure (Japanese Laid-open Patent Publication No. 223638/1983) has been proposed. However, the former polybutadiene acrylate is not only yet insufficient in curing speed, although higher than the aforesaid thermosetting type silicone resin, but also involve the drawback of being gradually elevated in modulus in the presence of oxygen due to low thermal stability, whereby transmission loss of the optical fiber will increase. On the other hand, the latter urethane acrylate is low in hydrolysis resistance, water absorption resistance and humidity resistance, and the optical fiber coated with this resin has the drawback of having markedly poor strength in water or under highly humid conditions.

As described above, the coating materials for optical fibers of the prior art had the problem of not being well balanced in the desired characteristics of curing speed, modulus, hydrolysis resistance, water absorption resistance, etc. after curing.

An object of the present invention is to solve the above problem of the coating materials for optical fibers of the prior art, specifically, to provide a UV-ray curable resin composition having high curing speed and affording a cured product having adequate modulus and good hydrolysis resistance, water absorption resistance and humidity resistance as the coating material for optical fibers.

Another object of the present invention is to provide a coated optical fiber having a coated layer comprising such a resin composition.

According to the present invention, there is provided, as means for solving the problem, a UV-ray curable resin composition comprising as the main component a polyurethane derived from a polyether polyol and a diene polymer having hydroxyl groups, said polyurethane having polymerizable double bonds different from the carbon-carbon double bonds contained in said diene polymer having hydroxyl groups.

Also, according to the present invention, there is provided an optical fiber having a coated layer comprising the cured product of the above resin composition.

The cured product of the UV-ray curable resin composition of the present invention has small modulus at normal temperatures and low temperatures and, when employed as the coated layer of an optical fiber, it can be made to have its small transmission loss over a wide temperature range. In addition, said cured product is excellent in hydrolysis resistance, water absorption resistance and humidity resistance, and the optical fiber coated with this resin suffers from no lowering in strength even in water or under highly humid conditions.

Also, since the resin composition solution is low in viscosity, its coating characteristics to optical fibers is excellent, and its great curing speed enables enhancement of the production rate of the coated optical fiber, thus being also excellent in bulk productivity.

Therefore, the UV-ray curable resin composition is well balanced in characteristics required for the coating material for optical fibers such as optical fibers comprising optical glass, optical fibers comprising plastic and the like, and therefore suitable as the coating material for optical fibers.

The polyurethane used in the present invention is composed of said polyether polyol, said diene polymer having hydroxyl group and a compound having a polymerizable double bond and hydroxyl group which are bonded through urethane bonds. This polyurethane is produced by use of the above-mentioned polyether polyol, a diene compound having hydroxyl group and a compound having a polymerizable double bond and hydroxyl group as the starting materials, and by allowing these materials to react with a diisocyanate compound to effect bonding through urethane bond.

Specific examples used in preparation of the polyurethane to be used in the present invention may include polyoxyethylene glycol, polyoxypropylene glycol, poly(oxypropylene) poly(oxypropylene) glycol, polyoxybutylene glycol, polyoxytetramethylene glycol, and the like. These polyether polyols should preferably have a number average molecular weight of 300 to 5,000, particularly preferably 500 to 3,000. Among the polyether polyols as exemplified above, polyoxytetramethylene glycol is the most preferred, since the resin composition obtained can form a cured product which is particularly excellent in hydrolysis resistance, water absorption resistance and humidity resistance.

On the other hand, the diene polymer having hydroxyl group used in the present invention is a polymer which is preferably obtained by polymerization of a diene with the use of aqueous hydrogen peroxide as the catalyst in the presence of a mutual solvent. The mutual solvent as herein mentioned refers to a solvent which can form a single phase system even when hydrogen peroxide and dienes may be mixed at any ratio. Such solvents may include alcohols, ketones, ethers and the like, which can be mixed with water at any ratio. Specific examples are methanol, ethanol, n-propanol, isopropanol, acetone, methyl ethyl ketone, methyl cellosolve, dioxane and the like. These mutual solvents are generally used at proportions of equal volume to aqueous hydrogen peroxide or higher. Hydrogen peroxide is employed as an aqueous hydrogen peroxide generally of 16 to 80 wt. %, preferably 30 to 60 wt. %. The amount of hydrogen peroxide employed may be generally 0.5 to 10 parts by weight, preferably 3 to 8 parts by weight, as hydrogen peroxide, based on 100 parts by weight of the diene. Further, the dienes employed may be, for example, 1,3-butadiene, isoprene, 2-chloro-1,3-butadiene and the like, and these dienes can also be used in combination. The polymerization temperature in such a polymerization process may generally be 90° to 150° C., preferably 100° to 130° C., and polymerization is practiced in an autoclave. The diene polymer having hydroxyl groups obtained by such a polymerization process should preferably have a number average molecular weight of 1000 to 5000, particularly 1200 to 3500.

Of the diene polymers having hydroxyl groups as prepared above, those having 60% or more, particularly 70% or more, of 1,4-bond units may preferably be used. This is because 1,4-bond units contribute to lowering in modulus of the resin composition obtained after curing. Now, it should be noted that, of the diene polymers having hydroxyl groups as mentioned above, those which have been hydrogenated can more preferably be employed. Such a hydrogenated diene polymer having hydroxyl groups can be prepared by hydrogenation of hydrogenated diene polymers having hydroxyl groups. Hydrogenation of a diene polymer having hydroxyl groups is performed for improvement of thermal stability of said diene polymer While the 1,4-bond units contained in said diene polymer have desirably the action of lowering modulus of the cured resin product as mentioned above, the double bonds of 1,2-bond units and 3,4-bond units tend to be crosslinked in the presence of oxygen, thus having the action of increasing modulus of the cured product with lapse of time, whereby thermal stability of the resin composition is impaired. Accordingly, it is particularly preferred that the hydrogenation of diene polymers having hydroxyl groups is affected selectively on the double bonds of 1,2-bond units and 3,4-bond units. In this case, a hydrogenation percentage on the double bonds of 1,2-bond units and 3,4-bond units of 60% or higher, particularly 70% or higher, is preferred. In this connection, in the case of ordinary hydrogenation which is not particularly selective on the double bonds of 1,2-bond units and 3,4-bond units, hydrogenation also occurs on the double bonds of 1,4-bond units, but it has been found that satisfactory modulus can be possessed with improvement of thermal stability by controlling the hydrogenation percentage. That is, a preferably hydrogenated diene polymer having hydroxyl groups can be obtained. In this case, the hydrogenation percentage should preferably be 10% or higher and less than 50%, particularly in the range of from 20 to 45%. If the hydrogenation percentage is less than 10%, the cured product of the resin composition obtained is insufficient in thermal stability, while hydrogenation over 50% will give a cured product with too high a modulus and, moreover, result in increased viscosity of the polyurethane, whereby the coating characteristic of the resin composition onto the optical fiber will be lowered.

Selective hydrogenation on 1,2-bond units and 3,4-bond units of the diene polymer having hydroxyl groups may be practiced by use of hydridecarbonyl tris(triphenylphosphine) rhodium (I), hydridetris(triphenylphosphine)-ruthenium (II) chloride, etc. as the catalyst, generally under a hydrogen pressure of 1 to 50 atm. at a reaction temperature of 10° to 100° C. On the other hand, non-selective hydrogenation may be carried out in a conventional manner by use of Raney-nickel or a carried catalyst of rhodium, palladium or ruthenium as the hydrogenation catalyst.

The diene polymer having hydroxyl groups may also be halogenated, and the halogens may be, for example, chlorine, bromine and iodine. Halogenation may be practiced in a conventional manner.

The proportions of the polyether polyol and the diene polymer having hydroxyl groups as described above may preferably be 0.1 to 5 moles, particularly 0.5 to 3 moles of the polyether polyol per one mole of the diene polymer having hydroxyl groups. If the amount of the polyether polyol is less than 0.1 mole per one mole of the above diene polymer, the resin composition obtained has an insufficient curing speed, while an amount in excess of 5 moles of the polyether polyol will worsen hydrolysis resistance, water absorption resistance and humidity resistance of the resin composition.

The polymerizable double bonds possessed by the polyurethane used in the present invention may include, for example, acryloyl groups, methacryloyl groups and the like. Among them, acryloyl group is particularly preferred for greater curing speed of the resin composition obtained. As the compound having the double bond to be used for introduction of the polymerizable double bond into the polyurethane and hydroxyl group, there may be included, for example, hydroxyalkyl acrylate and hydroxyalkyl methacrylate such as 2-hydroxyethyl acrylate, 2-hydroxyethyl, 2-hydroxypropyl acrylate, 2-hydroxypropyl methacrylate, 2-hydroxybutyl acrylate, 2-hydroxybutyl methacrylate, 2-hydroxyoctyl acrylate and the like, and compounds represented by the general formula:

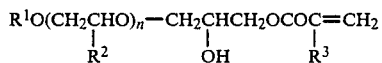

wherein $R^1$ is a $C_1$–$C_{15}$ alkyl group or an alkylphenyl group containing a $C_1$–$C_{12}$ alkyl group, $R^2$ is a hydrogen atom, methyl group or ethyl group, $R^3$ is a hydrogen atom or methyl group, and n is an integer of 0 to 10.

The amount of the above compound having the polymerizable double bond and hydroxyl group may preferably be 0.6 to 1.6 moles, particularly 0.8 to 1.4 moles, per one mole of the total amount of the polyether polyol and the diene polymer having hydroxyl groups. If the amount of the compound having the polymerizable double bond and hydroxyl group is less than 0.6 mole, the resin composition obtained is insufficient in curing speed, while an amount in excess of 1.6 moles will elevate the modulus of the cured product of the resin composition.

The diisocyanate compound to be used in preparation of the polyurethane of the present invention may include, for example, 2,4-tolylene diisocyanate, 2,6-tolylene diisocyanate, 1,3-xylylene diisocyanate, 1,5-naphthalene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, hexamethylene diisocyanate, isophorone diisocyanate, methylenebis(4-cyclohexyl isocyanate), and the like.

The amount of the above diisocyanate employed may preferably be 1.3 to 1.8 moles, particularly 1.4 to 1.7 moles, per one mole of the total amount of the polyether polyol and the diene polymer having hydroxyl groups. If the amount of the diisocyanate compound employed is less than 1.3 moles, the resin composition obtained is insufficient in curing speed, while an amount in excess of 1.8 moles will increase the modulus of the resin composition after curing.

The reaction for producing a polyurethane from the polyether polyol, the diene polymer having hydroxyl groups, the compound having a polymerizable double bond and hydroxyl group and the diisocyanate compound is a reaction which bonds these reactant starting materials through the urethane bondings formed. This reaction may be carried out generally at a reaction temperature of 0° to 80° C. by use of such a catalyst as copper naphthenate, cobalt nephthenate, zinc naphthenate, n-butyltin laurate and the like.

The order of the reaction of the reactant starting materials during production of the polyurethane according to the above reaction is not particularly limited, but there may be employed, for example, the following methods, namely:

(1) the method in which the four kinds of the reactant starting materials are allowed to react at the same time;

(2) the method in which the mixture of the polyether polyol and the diene polymer having hydroxyl groups is reacted with the diisocyanate compound, and then the resultant product is reacted with the compound having the polymerizable double bond and hydroxyl group;

(3) the method in which the polyether polyol or the diene polymer having hydroxyl groups is successively reacted with the diisocyanate compound, and then the resultant product is reacted with the compound having the polymerizable double bond and hydroxyl group;

(4) the method in which the diisocyanate compound is reacted with the compound having the polymerizable double bond and hydroxyl group, and then the resultant product is reacted with the mixture of the polyether polyol and the diene polymer having hydroxyl groups;

(5) the method in which the diisocyanate compound is reacted with the compound having the polymerizable double bond and hydroxyl group, and the resultant product is reacted with one of the polyether polyol and the diene polymer having hydroxyl groups, and then the product thus obtained is reacted with the other of the two compounds. Among these methods exemplified above, the method (5) is the most preferred because the polyurethane obtained is highly uniform in composition of the respective molecules and low in viscosity.

In preparation of the polyurethane to be used in the present invention, the polyether polyol may be used in combination with, for example, diols such as ethylene glycol, 1,4-butane diol, 1,6-hexane diol, etc.; diamines such as 1,4-butadienediamine, 1,6-hexanadiamine, polyoxyalkylenediamine, etc.; aminoalcohols such as monomethylethnanolamine, ethanolamine, etc.; dibasic acids such as succinic acid, adipic acid, malonic acid, etc.; hydroxycarboxylic acids such as glycine, alanine, etc. Their amounts may be generally 0.2 mole or less, preferably 0.1 mole or less, per one mole of the polyether polyol.

In the resin composition of the present invention, in addition to the above polyurethane, a photopolymerization initiator and preferably further a reactive diluent may be incorporated. The photopolymerization initiator which may be formulated is not particularly limited, but conventional photopolymerization initiators may be available. For example, there may be employed the following compounds:

2,2-dimethoxy-2-phenylacetophenone, acetophanone, benzophenone, xanthene, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Micheler's kelone, benzoin propyl ether, benzoin ethyl ether, benzyldimethylketal, 1-(4-isopropylphenyl)-2-hydroxy-2-methylpropane-1-one, 2-hydroxy-2-methyl-1-phenylpropane-1-one, thioxanthone type compounds, etc.

One or more of these photopolymerization initiators may be used either singly or in combination, and a sensitizer (photopolymerization accelerator) of an amine type compound, etc. may also be used in combination, if desired.

These photopolymerization initiators may be formulated in the resin composition of the present invention generally in an amount of 0.1 to 5% by weight.

The reactive diluent is important in controlling the viscosity of the resin composition and mechanical characteristics of the cured product. As the reactive diluent, both mono-functional compounds and poly-functional compounds may be available. When a cured product with relatively lower modulus is desired to be obtained, a mono-functional compound is primarily employed, but the modulus of the cured product may also be controlled by use of a poly-functional compound at an appropriate proportion in combination. These mono-functional compounds and poly-functional compounds are not particularly limited, but may be exemplified as follows:

mono-functional compounds: acrylic compounds such as 2-hydroxyethyl acrylate, 2-hydroxypropyl acrylate, tetrahydrofurfuryl acrylate, butoxyethyl acrylate, ethyldiethyleneglycol acrylate, 2-ethylhexyl acrylate, cyclohexyl acrylate, dicyclopentadiene acrylate, methyltriethyleneglycol acrylate, diethylaminoethyl acrylate, 7-amino-3,7-dimethyloctyl acrylate and the like; methacrylic compounds such as 2-hydroxyethyl methacrylate, 2-hydroxypropyl methacrylate, polypropyleneglycol methacrylate, diethylaminoethyl methacrylate and the like; vinyl pyrrolidone, vinyl phenol, acrylamide, vinyl ether, styrene, and compounds represented by the general formula:

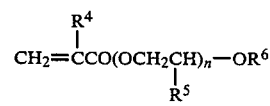

wherein $R^4$ is a hydrogen atom or methyl group, $R^5$ is a hydrogen atom or methyl group, $R^6$ is a $C_1$–$C_8$ alkyl group or an alkylphenyl group containing a $C_1$–$C_{12}$ alkyl group, and n is an integer of 1 to 12.

Poly-functional compounds: trimethylolpropane triacrylate, ethyleneglycol diacrylate, tetraethyleneglycol diacrylate, polyethyleneglycol diacrylate, 1,4-butanediol discrylate, 1,6-hexanediol diacrylate, neopentylglycol diacrylate, polyester diacrylate, diallyl adipate, diallyl phthalate and triallyl isocyanurate.

Among them, with respect to curing speed and compatibility, acrylates having acryloyl groups as functional groups are preferred.

In the present invention, in addition to those as described above, it is also possible to formulate various additives, such as antioxidants, colorants, UV-ray absorbers, silane coupling agents, fillers, solvents, lubricants, plasticizers, anti-aging agents, etc., if necessary.

The present invention is described in more detail with reference to Examples, to which the present invention is not limited.

EXAMPLES

Example 1

(1) An autoclave was charged with 100 parts by weight of 1,3-butadiene, 70 parts by weight of isopropanol and 20 parts by weight of 35 wt. % aqueous hydrogen peroxide, followed by polymerization at 10° C., to obtain a polybutadiene having hydroxyl groups at terminal ends (number average molecular weight 2800; hydroxyl group content 0.83 milliequivalent/g, namely average hydroxyl group number: 2.3 per one molecule; 1,4-bond content: 76%; 1,2-bond content: 24%). A 5-liter autoclave was charged with 200 g of this polybutadiene, one liter of toluene and 100 g of a catalyst of 5 wt. % ruthenium carried on carbon, and hydrogenation reaction was carried out under a hydrogen pressure of 50 Kg/cm$^2$ at a reaction temperature of 100° C. to obtain a hydrogenated polybutadiene having hydroxyl groups with a hydrogenation percentage of 27%. The hydrogenated polybutadiene having hydroxyl groups was found to have a number average molecular weight of 2800, a hydroxyl content of 0.83 milliequivalent/g, namely an average hydroxyl group number of 2.3 per molecule, unhydrogenated 1,4-bond units of 62%, unhydrogenated 1,2-bond units of 11%, hydrogenated 1,4-bond units of 14% and hydrogenated 1,2-bond units of 13%.

(2) Subsequently, a 0.5-liter three-necked flask equipped with a stirrer was charged with 55.9 g (0.321 mole) of 2,4-tolylene diisocyanate and 3 g of dibutyltin laurate, and under stirring, 69.6 g (0.107 mole) of a polyoxytetramethylene glycol (number average molecular weight: 650) was added dropwise at 35° C. over one hour, followed by the reaction at 50° C. for another one hour. Then, to the reaction mixture, 300 g (0.107 mole) of the above hydrogenated polybutadiene having hydroxyl groups was added dropwise at 35° C. over one hour, followed by the reaction at 50° C. for another one hour. To the reaction mixture was further added dropwise 24.8 g (0.214 mole) of 2-hydroxyethyl acrylate over one hour. Further, the reaction was continued for one hour to obtain 450 g of a polyurethane.

A resin composition was prepared by formulating 55 parts by weight of the thus prepared polyurethane, 37 parts by weight of 2-butoxyethyl acrylate and 3 parts by weight of benzil dimethyl ketal.

Example 2

A one-liter three-necked flask equipped with a stirrer was charged with 83.8 g (0.482 mole) of 2,4-tolylene diisocyanate and 3 g of dibutyltin laurate, and under stirring, 139 g (0.214 mole) of a polyoxytetramethylene glycol (number average molecular weight: 650) was added dropwise at 35° C. over one hour, followed by a reaction at 50° C. for another one hour. Next, to the reaction mixture, 300 g (0.107 mole) of the hydrogenated polybutadiene having hydroxyl groups prepared in Example 1 (1) was added dropwise at 35° C. over one hour, followed by a reaction at 50° C. for another one hour. To the reaction mixture was further added dropwise 37.4 g (0.322 mole) of 2-hydroxyethyl acrylate at 50° C. over one hour. The reaction was further continued for one hour to obtain 550 g of a polyurethane.

A resin composition was prepared by formulating 55 parts by weight of the thus prepared polyurethane, 37 parts by weight of 2-butoxyethyl acrylate and 3 parts by weight of benzil dimethyl ketal.

Example 3

Following the same procedure as in Example 2 except for changing the amount of 2,4-tolylene diisocyanate to 63.3 g (0.364 mole), the amount of the polyoxytetramethylene glycol (number average molecular weight: 650) to 69.6 g (0.107 mole) and the amount of 2-hydroxyethyl acrylate to 34.8 g (0.300 mole), the reaction was carried out to obtain 460 g of a polyurethane.

A resin composition was prepared by formulating 55 parts by weight of the thus prepared polyurethane, 37 parts by weight of 2-butoxyethyl acrylate and 3 parts by weight of benzil dimethyl ketal.

Example 4

Following the same procedure as in Example 2 except for changing the amount of 2,4-tolylene diisocyanate to 55.9 g (0.321 mole), employing 107 g (0.107 mole) of a polyoxypropylene glycol (number average molecular weight: 1000) in place of the polyoxytetramethylene glycol (number average molecular weight: 650) and changing the amount of 2-hydroxyethyl acrylate to 24.8 g (0.214 mole), the reaction was carried out to obtain 475 g of a polyurethane.

A resin composition was prepared by formulating 55 parts by weight of the thus prepared polyurethane, 37 parts by weight of 2-butoxyethyl acrylate and 3 parts by weight of benzil dimethyl ketal.

Example 5

A one-liter three-necked flask equipped with a stirrer was charged with 71.3 g (0.321 mole) of isophorone diisocyanate and 3 g of dibutyltin laurate, and to the mixture 24.8 g (0.214 mole) of 2-hydroxyethyl acrylate was added dropwise under stirring at 20° C. over one hour, followed by a reaction for another one hour. Next, to the reaction mixture, 69.6 g (0.107 mole) of a polyoxytetramethylene glycol (number average molecular weight: 650) was added dropwise at 35° C. over one hour, followed by a reaction at 50° C. for another one hour. Then, to the reaction mixture, 300 g (0.107 mole) of the hydrogenated polybutadiene having hydroxyl group prepared in Example 1 (1) was added dropwise at 35° C. over one hour, followed by a reaction at 50° C. for another one hour to obtain 535 g of a polyurethane.

A resin composition was prepared by formulating 55 parts by weight of the thus prepared polyurethane, 37 parts by weight of 2-butoxyethyl acrylate and 3 parts by weight of benzil dimethyl ketal.

Example 6

A resin composition was prepared by formulating 55 parts by weight of the polyurethane prepared in Example 5, 37 parts by weight of nonylphenyloctaethylene glycol acrylate and 3 parts by weight of benzil dimethyl ketal.

Example 7

A resin composition was prepared by formulating 55 parts by weight of the polyurethane prepared in Example 5, 37 parts by weight of ethyltriethylene glycol acrylate and 3 parts by weight of benzil dimethyl ketal.

Example 8

Following the same procedure as in Example 5 except for replacing 71.3 g (0.321 mole) of isophorone diisocyanate by 63.3 g (0.364 mole) of 2,4-tolylene diisocyanate, changing the amount of 2-hydroxyethyl acrylate to 34.8 g (0.300 mole) and replacing 69.6 g (0.107 mole) of the polyoxytetramethylene glycol (number average molecular weight: 650) by 107 g (0.107 mole) of a polyoxytetramethylene glycol (number average molecular weight: 1000), the reaction was carried out to obtain 500 g of a polyurethane.

A resin composition was prepared by formulating 55 parts by weight of the thus prepared polyurethane, 37 parts by weight of 2-butoxyethyl acrylate and 3 parts by weight of benzil dimethyl ketal.

Comparative Example 1

A 0.5-liter three-necked flask equipped with a stirrer was charged with 37.2 g (0.214 mole) of 2,4-tolylene diisocyanate and 3 g of dibutyltin laurate, and under stirring, 300 g (0.107 mole) of the hydrogenated polybutadiene having hydroxyl groups prepared in Example 1 (1) was added dropwise at 35° C. over one hour, followed by a reaction at 50° C. for another one hour. To the reaction mixture was further added dropwise 24.8 g (0.214 mole) of 2-hydroxyethyl acrylate at 35° C. over one hour. The reaction was further continued at 50° C. for one hour to obtain 351 g of a hydrogenated polybutadiene acrylate.

A resin composition was prepared by formulating 55 parts by weight of the thus prepared hydrogenated polybutadiene acrylate, 37 parts by weight of 2-butoxyethyl acrylate and 3 parts by weight of benzil dimethyl ketal.

Comparative Example 2

Following the same procedure as in Comparative example 1, except for changing the amount of 2,4-tolylene diisocyanate to 87.0 g (0.500 mole), employing 260 g (0.400 mole) of a polyoxytetramethylene glycol (number average molecular weight: 650) in place of the hydrogenated polybutadiene having hydroxyl groups and changing the amount of 2-hydroxyethyl acrylate to 23.2 g (0.200 mole), the reaction was carried out to obtain 350 g of a polyurethane.

A resin composition was prepared by formulating 55 parts by weight of the thus prepared polyurethane, 37 parts by weight of 2-butoxyethyl acrylate and 3 parts by weight of benzil dimethyl ketal.

Comparative Example 3

Following the same procedure as in Comparative example 1, except for changing the amount of 2,4-tolylene diisocyanate to 69.6 g (0.400 mole), employing 500 g (0.300 mole) of a polyoxypropylene glycol (number average molecular weight: 1000) in place of the hydrogenated polybutadiene having hydroxyl groups and changing the amount of 2-hydroxyethyl acrylate to 23.2 g (0.200 mole), the reaction was carried out to obtain 381 g of a polyurethane.

A resin composition was prepared by formulating 55 parts by weight of the thus prepared polyurethane, 37 parts by weight of 2-butoxyethyl acrylate and 3 parts by weight of benzil dimethyl ketal.

Evaluation

For the resin composition prepared in Examples 1–8 and Comparative Examples 1–3, the following evaluations were conducted. The results are summarized in Table 1 and Table 2.

(1) Modulus:

The coating of a resin composition is irradiated with UV-ray by use of a high pressure mercury lamp of 80 w/cm to prepare a cured sheet with a thickness of 250 $\mu$m, and the moduli of said cured sheet at 20° C. and −40° C. were measured.

(2) Transmission loss:

A VAD graded type optical fiber with an outer diameter of 125 $\mu$m spun at a speed of 60 m/min, was coated simultaneously with spinning with a resin composition to a thickness of 60 $\mu$m, followed immediately by curing by use of a high pressure mercury lamp. The transmission losses of said coated optical fiber at the wavelength of 0.85 $\mu$m were measured at 20° C. and −40° C.

(3) Viscosity of resin composition solution:

The viscosity of the resin composition was measured by B-type viscometer at 40° C.

(4) Curing speed:

The coating of a resin composition was irradiated by a high pressure mercury lamp of 80 w/cm at various doses to prepare several kinds of sheets with a thickness of 250 $\mu$m. Then, the sheets were extracted with toluene by means of Soxhlet extractor. The extraction residue percentage was measured, and the minimum UV-ray dose necessary for causing the extraction residue percentage to reach a constant value was determined.

(5) Hydrolysis resistance:

The coating of a resin composition was irrediated with UV-ray of 1 J/cm$^2$ by use of a high pressure mercury lamp of 80 w/cm to prepare a cured sheet with a thickness of 250 $\mu$m. Said cured sheet was immersed in hot water at 80° C. for 30 days, and the modulus, strength at break and elongation at break of the cured sheet were measured before and after the aging.

(6) Water absorption percentage:

The coating of a resin composition was irradiated with UV-ray of 1 J/cm$^2$ by use of a high pressure mercury lamp of 80 w/cm to prepare a cured sheet of 50 mm×50 mm×250 $\mu$m thickness, and water absorption percentage was measured according to the method of JIS K 7209 8 with the use of this cured sheet as a sample.

(7) Hygroscopicity percentage:

A sample was prepared similarly as the sample for measurement of water absorption percentage, and the weight after left to stand under the conditions of 23° C., 95% RH for 24 hours ($W_1$) and the weight after left to stand under the conditions of 23° C., 50% RH for 24 hours ($W_2$) were measured, and the hygroscopicity percentage was calculated from the following formula:

Hygroscopicity (%) = $(W_1 - W_2)/W_2 \times 100$ (8) Coated optical fiber strength:

A VAD graded type optical fiber with an outer diameter of 125 μm spun at a speed of 60 m/min, was coated simultaneously with spinning with a resin composition to a thickness of 60 μm, followed immediately by curing by use of a high pressure mercury lamp of 3 kW. The coated optical fiber obtained was left to stand in an atmosphere of a temperature of 60° C. and a relative humidity of 95% for 30 days, and thereafter strength at break was determined by tensile test. With the sample length (distance between two gage marks) being made 2 m, the drawing speed 5% of the sample length/min., the test was conducted in number of 10 samples for respective Examples and Comparative examples, from which the average strength at break was determined.

TABLE 1

|  | Example 1 | Example 2 | Example 3 | Example 4 | Example 5 | Example 6 | Example 7 | Example 8 |
|---|---|---|---|---|---|---|---|---|
| Molar ratio of hydrogenated diene polymer having OH groups/polyether diol* | 1/1 (polyoxytetramethylene glycol) | 1/2 (polyoxytetramethylene glycol) | 1/1 (polyoxytetramethylene glycol) | 1/1 (polyoxypropylene glycol) | 1/1 (polyoxytetramethylene glycol) | 1/1 (polyoxytetramethylene glycol) | 1/1 (polyoxytetramethylene glycol) | 1/1 (polyoxytetramethylene glycol) |
| Molar ratio of diisocyanate/hydrogenated diene polymer having OH groups + polyether diol | 1.50 | 1.50 | 1.70 | 1.50 | 1.50 | 1.50 | 1.50 | 1.70 |
| Modulus (Kg/cm$^2$) | | | | | | | | |
| 20° C. | 33 | 33 | 35 | 30 | 31 | 23 | 25 | 33 |
| −40° C. | 54 | 46 | 83 | 48 | 38 | 35 | 28 | 52 |
| Transmission loss (dB/km) | | | | | | | | |
| 20° C. | 2.32 | 2.32 | 2.32 | 2.32 | 2.32 | 2.32 | 2.32 | 2.32 |
| −40° C. | 2.33 | 2.32 | 2.33 | 2.33 | 2.32 | 2.32 | 2.32 | 2.33 |
| Viscosity of resin composition (cps, 40° C.) | 2,900 | 3,100 | 2,300 | 3,100 | 300 | 800 | 400 | 200 |
| Curing speed (J/cm$^2$) | 0.15 | 0.10 | 0.10 | 0.15 | 0.10 | 0.07 | 0.07 | 0.07 |
| Hydrolysis resistance: Initial: | | | | | | | | |
| Modulus (Kg/cm$^2$) | 33 | 33 | 35 | 30 | 31 | 23 | 25 | 33 |
| Strength at break (Kg/cm$^2$) | 12 | 13 | 18 | 12 | 15 | 13 | 13 | 16 |
| Elongation at break (%) | 70 | 78 | 48 | 80 | 110 | 100 | 120 | 100 |
| After test: | | | | | | | | |
| Modulus (Kg/cm$^2$) | 31 | 32 | 35 | 28 | 30 | 23 | 24 | 33 |
| Strength at break (Kg/cm$^2$) | 12 | 12 | 17 | 10 | 15 | 14 | 12 | 14 |
| Elongation at break (%) | 65 | 70 | 50 | 71 | 100 | 100 | 110 | 95 |
| Water absorption (%) | 0.70 | 0.88 | 0.68 | 0.95 | 0.70 | 0.60 | 0.75 | 0.70 |
| Hygroscopicity (%) | 0.62 | 0.81 | 0.59 | 0.88 | 0.62 | 0.56 | 0.63 | 0.62 |
| Coated optical fiber strength (Kg/mm$^2$) | | | | | | | | |
| Initial value: | 474 | 481 | 463 | 465 | 485 | 488 | 478 | 481 |
| After 30 days: | 473 | 473 | 465 | 466 | 483 | 485 | 475 | 477 |

Note:
*The polyether diol used is indicated in parentheses.

TABLE 2

|  | Comparative example 1 | Comparative example 2 | Comparative example 3 |
|---|---|---|---|
| Hydrogenated diene polymer having OH groups or polyether diol | only hydrogenated diene polymer having OH groups | only polyoxytetramethylene glycol | only polyoxytetramethylene glycol |
| Molar ratio of diisocyanate/hydrogenated diene polymer or polyether diol | 2.0 | 1.25 | 1.33 |
| Modulus (Kg/cm$^2$) | | | |
| 20° C. | 27 | 35 | 32 |
| −40° C. | 65 | 60 | 56 |
| Transmission loss (dB/km) | | | |
| 20° C. | 2.32 | 2.32 | 2.32 |
| −40° C. | 2.33 | 2.33 | 2.33 |
| Viscosity of resin composition (cps, 40° C.) | 2,100 | 2,800 | 3,000 |
| Curing speed (J/cm$^2$) | 0.50 | 0.10 | 0.10 |
| Hydrolysis resistance: Initial: | | | |
| Modulus (Kg/cm$^2$) | 27 | 35 | 32 |
| Strength at break (Kg/cm$^2$) | 11 | 16 | 13 |
| Elongation at break (%) | 59 | 110 | 120 |
| After test: | | | |
| Modulus (Kg/cm$^2$) | 29 | 20 | 15 |
| Strength at break (Kg/cm$^2$) | 11 | 12 | 8 |
| Elongation at break (%) | 55 | 83 | 85 |
| Water absorption (%) | 0.55 | 1.56 | 2.33 |
| Hygroscopicity (%) | 0.48 | 1.39 | 2.18 |

TABLE 2-continued

|  | Comparative example 1 | Comparative example 2 | Comparative example 3 |
|---|---|---|---|
| Coated optical fiber strength (Kg/mm$^2$): | | | |
| Initial value: | 477 | 466 | 473 |
| After 30 days: | 473 | 327 | 341 |

We claim:

1. A UV-ray curable resin composition, comprising a polyurethane having a polymerizable double bond, consisting essentially of units of:
   (a) a diene polymer having one or more hydroxyl groups,
   (b) a polyether polyol having a number average molecular weight of 300–5,000 in an amount of 0.1 to 5 moles per mole of said diene polymer having a hydroxyl group,
   (c) a compound having a polymerizable double bond and a hydroxyl group in an amount of 0.6 to 1.6 moles per mole of the total amount of the diene polymer having the hydroxyl group and said polyether polyol, and
   (d) a diisocyanate compound in an amount of 1.3 to 1.8 moles per mole of the total amount of the diene polymer having the hydroxyl group and said polyether polyol, wherein components (a),(b),(c) and (d) are bonded through urethane linkages.

2. The composition according to claim 1, wherein said polyurethane is produced by:
   (a) reacting a mixture of said polyether polyol, said diene polymer having one or more hydroxyl group, said compound having a polymerizable double bond and a hydroxyl group, and said diisocyanate compound; or
   (b) reacting a mixture of said polyether polyol and said diene polymer having one or more hydroxyl groups with said diisocyanate compound to form a product, and then reacting said product with said compound having the polymerizable double bond and hydroxyl groups; or
   (c) reacting the polyether polyol and then the diene polymer with one or more hydroxyl groups, in succession, with said diisocyanate compound to form a product, then reacting the product with the compound having the polymerizable double bond and hydroxyl groups; or
   (d) reacting the diisocyanate compound with the compound having the polymerizable double bond and hydroxyl group to form a product, then reacting the product with a mixture of the polyether polyol and diene polymer having one or more hydroxyl groups; or
   (e) reacting the diisocyanate compound with the compound having the polymerizable double bond and hydroxyl group to form a product, then reacting the product with one of said polyether polyol or said diene polymer having one or more hydroxyl groups to form a second product, and then reacting the second product with the other of said polyether polyol or diene polymer.

3. The composition according to claim 1 said polyurethane is a product produced by reaction of said polyether polyol, said diene polymer having hydroxyl group and said compound having a polymerizable double bond and hydroxyl group with said diisocyanate compound.

4. The composition according to claim 1, wherein said diene polymer having hydroxyl group is a polymer prepared by polymerization of a diene with the use of aqueous hydrogen peroxide as a catalyst in the presence of a mutual solvent.

5. The composition according to claim 4, wherein said diene polymer has at least 60% of 1,4-bond units in its molecule.

6. The composition according to claim 1, wherein said diene polymer having hydroxyl group is a diene polymer having hydroxy group selectively hydrogenated on the double bonds of 1,2-bond units and 3,4-bond units therein and the hydrogenation percentage thereof is at least 60%.

7. The composition according to claim 1, wherein said diene polymer having hydroxyl group is a diene polymer having hydroxy group non-selectively hydrogenated on the double bonds therein and the hydrogenation percentage thereof is at least 10% and less than 50%.

8. The composition according to claim 1, wherein said polymerizable double bond is contained as acrylic group or methacrylic group.

9. The composition according to claim 1, wherein said polyurethane is the product prepared by reacting said diisocyanate compound with the compound having polymerizable double bond and hydroxyl group, reacting the resultant product with one of the polyether polyol and the diene polymer having hydroxyl groups, and reacting the product thus obtained with the other of the two compounds.

10. A coated optical fiber, having a coated layer comprising the cured product of the resin composition claimed in claim 1.

* * * * *